United States Patent
Karl

(10) Patent No.: US 10,006,999 B2
(45) Date of Patent: Jun. 26, 2018

(54) DRIVER ASSISTANCE SYSTEM FOR DETECTING AN OBJECT IN THE SURROUNDINGS OF A VEHICLE

(75) Inventor: Matthias Karl, Ettlingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 870 days.

(21) Appl. No.: 13/990,604

(22) PCT Filed: Nov. 2, 2011

(86) PCT No.: PCT/EP2011/069250
§ 371 (c)(1),
(2), (4) Date: Aug. 15, 2013

(87) PCT Pub. No.: WO2012/072360
PCT Pub. Date: Jun. 7, 2012

(65) Prior Publication Data
US 2013/0329523 A1    Dec. 12, 2013

(30) Foreign Application Priority Data

Dec. 1, 2010 (DE) .......... 10 2010 062 235

(51) Int. Cl.
| | |
|---|---|
| *G01S 15/00* | (2006.01) |
| *G01S 15/93* | (2006.01) |
| *G01S 7/527* | (2006.01) |
| *G01S 13/58* | (2006.01) |
| *G01S 15/42* | (2006.01) |
| *G01S 15/58* | (2006.01) |
| *G01S 7/292* | (2006.01) |
| *G01S 13/93* | (2006.01) |

(52) U.S. Cl.
CPC .......... *G01S 15/931* (2013.01); *G01S 7/5276* (2013.01); *G01S 13/588* (2013.01); *G01S 15/42* (2013.01); *G01S 15/582* (2013.01); *G01S 7/2925* (2013.01); *G01S 15/588* (2013.01); *G01S 2013/9314* (2013.01); *G01S 2015/933* (2013.01)

(58) Field of Classification Search
USPC .......................................... 367/99
See application file for complete search history.

(56) References Cited

U.S. PATENT DOCUMENTS

| | | | |
|---|---|---|---|
| 5,224,075 A | 6/1993 | Iino et al. | |
| 7,109,920 B2 * | 9/2006 | Davenport et al. | 342/418 |
| 7,123,544 B1 * | 10/2006 | Kuklinski | 367/89 |

(Continued)

FOREIGN PATENT DOCUMENTS

| | | |
|---|---|---|
| CN | 101241186 | 8/2008 |
| DE | 4 427 693 | 2/1996 |

(Continued)

*Primary Examiner* — James R Hulka
(74) *Attorney, Agent, or Firm* — Norton Rose Fulbright US LLP; Gerard Messina

(57) ABSTRACT

A method in a driver assistance system of a vehicle for detecting an object in the surroundings of the vehicle. The method has the following steps: emission of at least one measuring pulse by a transmitter; reception of a reflection of the measuring pulse by at least one receiver; determination of a Doppler shift between the emitted measuring pulse and the received reflection in an analysis unit; and determination of a direction toward the object based on the determined Doppler shift.

13 Claims, 8 Drawing Sheets

(56) References Cited

U.S. PATENT DOCUMENTS

| | | | |
|---|---|---|---|
| 2005/0012666 A1* | 1/2005 | Davenport et al. | 342/418 |
| 2005/0035879 A1* | 2/2005 | Gotzig | B60Q 9/006 340/932.2 |
| 2005/0058021 A1* | 3/2005 | Feintuch et al. | 367/99 |
| 2005/0088334 A1* | 4/2005 | Herder | G01S 7/527 342/70 |
| 2005/0122234 A1* | 6/2005 | Danz | B60Q 9/007 340/932.2 |
| 2005/0135190 A1* | 6/2005 | Katou et al. | 367/99 |
| 2005/0156779 A1* | 7/2005 | Wixforth | G01S 7/288 342/70 |
| 2007/0038108 A1* | 2/2007 | Hao et al. | 600/454 |
| 2007/0091719 A1* | 4/2007 | Falkenberg et al. | 367/19 |
| 2008/0232198 A1* | 9/2008 | Hayasaka | G01S 7/52004 367/99 |
| 2009/0016162 A1* | 1/2009 | Takagi et al. | 367/99 |
| 2010/0019935 A1* | 1/2010 | Kawabata | B60R 1/00 340/932.2 |
| 2010/0023195 A1* | 1/2010 | Traster | 701/23 |
| 2010/0049413 A1* | 2/2010 | Makino | B60R 1/00 701/65 |
| 2010/0253541 A1* | 10/2010 | Seder | G01S 13/723 340/905 |
| 2010/0332078 A1* | 12/2010 | Hering | G01S 15/87 701/36 |
| 2011/0025548 A1* | 2/2011 | Nickolaou | G01S 13/72 342/52 |
| 2011/0116717 A1* | 5/2011 | Lee | G01S 15/025 382/199 |
| 2011/0181456 A1* | 7/2011 | Luebbert et al. | 342/70 |
| 2011/0261652 A1* | 10/2011 | Horsky | B06B 1/0253 367/97 |
| 2011/0267924 A1* | 11/2011 | Horsky et al. | 367/99 |
| 2012/0041693 A1* | 2/2012 | Liao et al. | 702/48 |

FOREIGN PATENT DOCUMENTS

| | | |
|---|---|---|
| DE | 103 10 214 | 7/2004 |
| DE | 10 2006 02846 | 12/2007 |
| DE | 10 2008 045190 | 3/2010 |
| DE | 10 2009 028992 | 3/2011 |
| EP | 1 566 657 | 8/2005 |
| EP | 2 023 156 | 2/2009 |
| WO | WO 2007147533 A1 * | 12/2007 ............. G01S 13/34 |

* cited by examiner

DRIVER ASSISTANCE SYSTEM FOR DETECTING AN OBJECT IN THE SURROUNDINGS OF A VEHICLE

FIELD OF THE INVENTION

The present invention relates to a method in a driver assistance system of a vehicle for detecting an object in the surroundings of the vehicle, and such a driver assistance system. In particular, the present invention relates to an ultrasound-based parking assist system, as is used, for example, for measuring parking spaces.

BACKGROUND INFORMATION

For example, parking assistants, which detect objects located in a space laterally adjacent to the driving path of a vehicle, in order to find a parking space (PSL, "parking space localization") fall in the field of driver assistance systems. These or other assistants additionally carry out object detection in order to make guiding or operability of the vehicle easier, to avoid accidents, etc. For this purpose, objects such as other (parked) vehicles, stationary structures, for example, curbsides, walls, hedges, buildings, vegetation, but also humans are to be detected, who are currently moving through a potential parking space. After successful detection, the driver is informed about the detected objects, for example, by an acoustic or visual display. Active assistance (sub)systems also engage to assist in the vehicle guiding based on the detection, for example, by acceleration, braking, or steering.

In the case of an ultrasound-based system, a plurality of ultrasound sensors is typically attached in a front and/or rear area. In particular, at least one sensor is located in most cases laterally or diagonally to the driving direction, for example, on a front fender of the vehicle. This sensor measures the space adjacent to the driving lane, in that measuring signals are emitted at certain time intervals as the vehicle passes, for example, in the form of pulsed energy emissions. The distance between object and sensor and therefore to the vehicle may be determined from the propagation time of the signal reflected from an object in the surroundings of the vehicle.

In order to be able to determine a direction toward the object in addition to an object distance, the sensor should have a particularly high sensitivity in precisely one (narrow) solid angle range, i.e., the sensor should have a pronounced directional characteristic. However, more frequent measuring pulses must accordingly be emitted in the case of a pronounced directional characteristic, in order to be able to reliably detect objects located laterally adjacent to the driving lane. The maximum pulse frequency is in turn delimited in particular if ultrasound is used due to its comparatively low propagation speed in comparison to electromagnetic radiation such as radar or infrared. Therefore, reliable detection is no longer ensured at a relatively high speed in the case of high location resolution because of the narrow directional characteristic.

A less pronounced directional characteristic having a larger aperture angle and/or multiple angle ranges, which are distributed over the solid angle, having comparatively high sensitivity (i.e., multiple "lobes" or "fingers") is typically accompanied by generally decreased sensitivity, i.e., range. In the case of a diffuse or multi-finger directional characteristic, it is also no longer possible to determine the direction toward the object with the desired high precision. To increase the precision, complex configurations are necessary, for example, parallel measurements using multiple sensors must be provided, other radiations such as radar or infrared being used in addition to ultrasound, if necessary. This results in high costs for such assistance systems.

SUMMARY OF THE INVENTION

According to the exemplary embodiments and/or exemplary methods of the present invention, a method is provided in a driver assistance system of a vehicle for detecting an object in the surroundings of the vehicle. The method includes the following steps: emission of at least one measuring pulse by a transmitter; reception of a reflection of the measuring pulse by at least one receiver; determination of a Doppler shift between the emitted measuring pulse and the received reflection in an analysis unit; and determination of a direction toward the object based on the determined Doppler shift.

To determine the Doppler shift, a shift of a pulse signal frequency, a shift of a pulse shape, and/or a shift of a time interval between two measuring pulses may be ascertained. In one specific embodiment of the method according to the present invention, at least two of the mentioned shifts are ascertained to determine the Doppler shift.

To determine the Doppler shift, a time difference in a period duration within the signal frequency of a measuring pulse (i.e., a time difference in a period duration of the carrier frequency within a carrier-modulated pulse), a time difference in a pulse width, and/or a time difference in a pulse interval may be registered.

One variant of the method according to the present invention includes the following further steps: determination of a distance to the object based on the received reflection in the analysis unit; and determination of a spatial position of the object in the surroundings of the vehicle based on the distance and direction.

The analysis unit may be situated detached from the transmitter and the one receiver or the multiple receivers. In this case, time reference information may be exchanged between a processing component (e.g., ECU), which optionally accommodates the analysis unit, on the one hand, and the transmitter or the receiver(s), on the other hand. Non-linear coding may be used to transmit transmitted information from the transmitter to the analysis unit and to transmit received information from the receiver to the analysis unit.

Furthermore, a computer program for carrying out one of the methods described herein is provided according to the present invention, when the computer program is executed on a programmable computer device. The computer device may be, for example, central or distributed hardware, on which a driver assistance system of a vehicle is implemented. The computer program may include multiple parts, of which one part is implemented on a transmitter and/or receiver or sensor, for example, and another part is implemented in a control and/or analysis unit, such as an ECU ("electronic control unit"). The computer program may be stored on a machine-readable storage medium, for example, on a permanent or rewritable storage medium or in assignment to a computer device or on a removable CD-ROM, DVD, or a USB stick. Additionally or alternatively, the computer program may be provided on a computer device for downloading, e.g., via a data network such as the Internet or a communication connection such as a telephone line or a wireless connection.

Furthermore, a driver assistance system in a vehicle for detecting an object in the surroundings of the vehicle is provided according to the present invention, the driver assistance system having the following components: a transmitter for emitting at least one measuring pulse; at least one receiver for receiving a reflection of the measuring pulse; an analysis unit for determining a Doppler shift between the emitted measuring pulse and the received reflection; and a component for determining a direction toward the object based on the determined Doppler shift.

The transmitter and the receiver(s) may operate based on ultrasound, for example. The method or the driver assistance system outlined here may be provided in particular for measuring a parking space, for passive or active assistance when parking in a parking space, and/or to avoid or prevent accidents.

The exemplary embodiments and/or exemplary methods of the present invention allow a cost-effective driver assistance system to be provided, which reliably allows spatial detection of objects in the surroundings of a vehicle. Such a system may operate solely based on ultrasound, for example, so that only cost-effective ultrasonic sensors are necessary. A spatial assignment of the object according to direction and distance is made possible, although only a very small number of receivers is necessary; for example, one transmitter and one receiver are sufficient, i.e., for example, a typical piezoelectric-based ultrasonic sensor, for example.

Sensors having a particularly pronounced directional characteristic are not necessary for the method; sensors having a greater aperture angle and/or multiple angle ranges (i.e., multiple "lobes" or "fingers") of high sensitivity may be used.

A particularly high pulse frequency is not necessary to measure the surroundings, which allows the use of components of known ultrasound-based systems.

The method reliably detects directions toward objects, in particular also at higher speeds, and thus advantageously allows the detection of objects and, for example, also measuring of parking spaces as the vehicle passes.

The analysis of the measurements may be carried out in an analysis unit which is detached from the sensors. Such an analysis unit may be implemented, for example, in an already existing control unit for a driver assistance system, i.e., for example, an ECU. Multiple sensors, i.e., multiple receivers and/or transmitters, may be connected to one such analysis unit. The outlay for the provision of further assemblies or wiring or terminals, or also the implementation of further software, firmware, etc., may therefore be minimized.

The emitted measuring pulses may be used simultaneously for the distance determination and direction determination toward objects. Further or additional measuring pulses for the distance measurement are thus not necessary.

An ultrasonic sensor already has its own time reference (a separate clock) under certain circumstances, for example, if it is intended for wireless connection. The method according to the present invention may (re-)use this time reference.

The data traffic which is required between transmitters/receivers, on the one hand, and the analysis unit, on the other hand, in the case of a detached analysis may be minimized. A particularly high pulse frequency is not necessary for the present invention in the first place. Furthermore, for example, nonlinear coding may be used, with the aid of which a data representation adapted to the purpose of the detection is selected.

Further aspects and advantages of the present invention will be described in greater detail hereafter on the basis of the appended figures.

DETAILED DESCRIPTION

Figure 1:
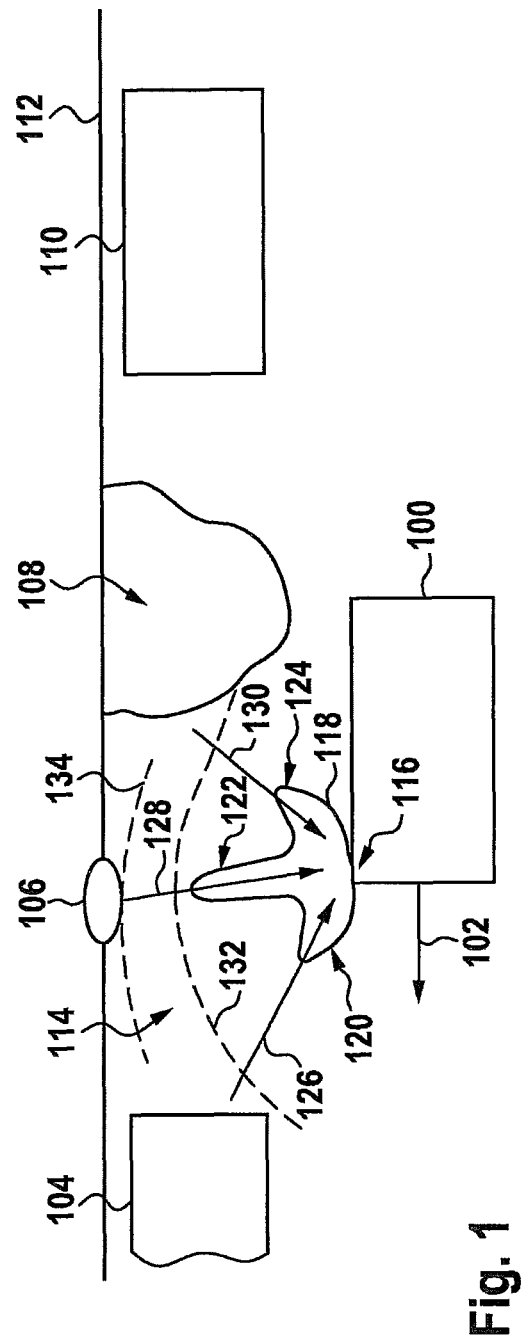
FIG. 1 shows an exemplary scenario for the surroundings of a vehicle.

FIG. 1 schematically shows an exemplary situation, on the basis of which the exemplary embodiments and/or exemplary methods of the present invention will be explained in greater detail hereafter. A vehicle 100 moves in a driving direction, which is indicated by an arrow 102, along objects 104 through 110. Objects 104 and 110 are, for example, parked vehicles, object 108 is vegetation, and object 106 is a person who is currently moving from a curbside 112 into a parking space 114.

An ultrasonic receiver 116 is attached laterally on vehicle 100, whose directional characteristic 118 is indicated in the figure using a solid line. Directional characteristic 118 has three lobes or fingers 120, 122, and 124 having particularly high sensitivity. Characteristic 118 is therefore a typical characteristic having main lobe 122 and secondary lobes 120, 124, as is known to those skilled in the art.

Receiver 116 may be, for example, a sensor or electroacoustic transducer, which converts electrical signals into acoustic (ultrasonic) signals and vice versa (directional characteristic 118 may relate both to the emission of signals and also the sensitivity with which reflections are received). The emitted signals or measuring pulses propagate at the speed of sound and are reflected on objects 104, 106, and 108. Reflected signals or reflections or echoes 126, 128, and 130 are also indicated as arrows in FIG. 1.

The exemplary embodiments and/or exemplary methods of the present invention are not based on the use of receivers or sensors having directional characteristic 118 shown in FIG. 1. The exemplary embodiments and/or exemplary methods of the present invention are not based on any type of specific directional characteristic at all. The scenario shown in FIG. 1 is only used to explain properties and advantages of the present invention. For this reason, the exemplary situation in FIG. 1 is configured in such a way that echoes 126, 128, and 130 of objects 104, 106, and 108 are coincident with lobes 120, 122, and 124 of directional characteristic 118. The echoes of these three objects are thus registered with particular sensitivity. In addition, all three objects are at approximately the same distance from receiver 116, as indicated by dashed lines 132 and 134, which are lines of constant distances from receiver 116. Therefore, all echoes 126, 128, and 130 arrive at approximately the same time at receiver 116.

A typical assistance system may thus only conclude based on the received echoes that at least one object is located in a distance range as delimited by lines 132, 134. The angle at which the object(s) is/are located may not be established without additional measurements and/or sensors.

Alternatively, as a replacement for receiver 116, a receiver having a significantly more strongly focused directional characteristic may be provided, which only has lobe 122, for example. Then, at the moment recorded in FIG. 1, only object 106 would be detected, and its solid angle (corresponding to lobe 122) could be specified precisely. However, neither of objects 104 or 108 would be detected using this measuring pulse. For object detection which is both directionally precise and reliable, a high pulse frequency would therefore be necessary in order to be able to detect objects 108, 106, 104 successively as the vehicle passes them. The maximum pulse frequency is delimited by the sonic velocity, however, which has the result that such an alternative system also only delivers reliable results at low vehicle speeds.

Figure 2:
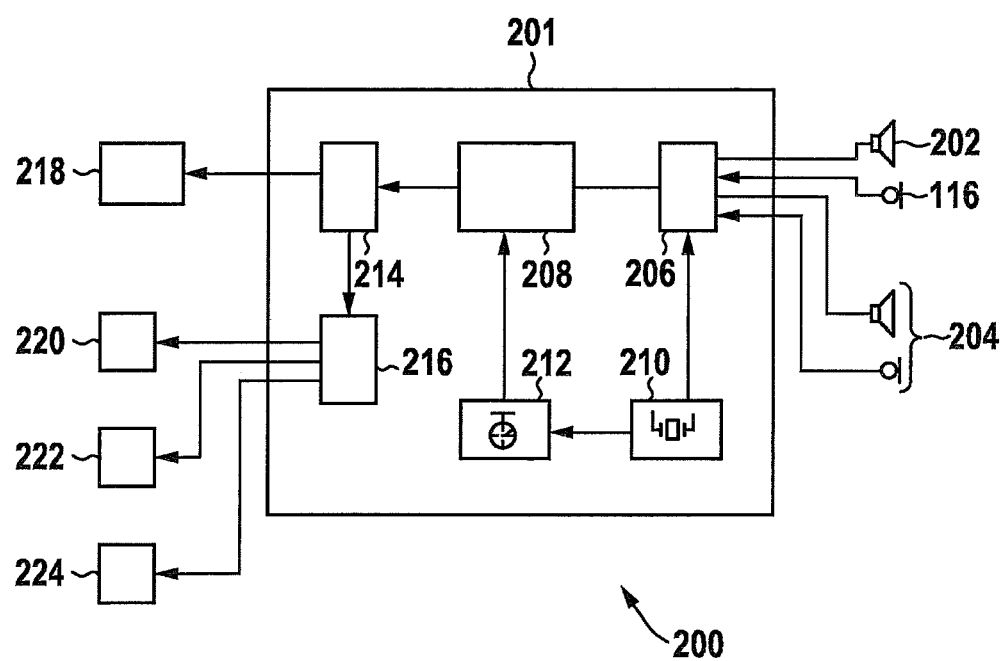
FIG. 2 shows functional components of a first exemplary embodiment of a driver assistance system according to the present invention.

FIG. 2 illustrates functional components of a driver assistance system 200 according to the present invention in the form of a block diagram. It is assumed hereafter for purposes of the discussion that driver assistance system 200 is installed in vehicle 100 from FIG. 1. A central control and analysis unit 201 is implemented on a hardware component, for example, an ECU. Reference is made hereafter frequently to control and analysis unit 201 as "ECU 201" as an abbreviation.

A transceiver pair 202/116 including an ultrasonic transmitter 202 and receiver 116 already shown in FIG. 1 is connected to ECU 201, and optionally other transmitters and/or receivers, of which only one transceiver pair 204 is indicated as an example. Each transmitter and/or receiver 202/116 or 204 may be represented, for example, by an ultrasonic sensor.

ECU 201 has an internal control unit 206, an analysis unit 208, a time reference 210, and a time measuring unit 212. Furthermore, a representation unit 214 and an activation unit 216 are provided. ECU 201 is connected here to a driver information system 218, a lateral control component (steering controller) 220, a brake controller 222, and an engine controller 224.

A mode of operation of ECU 201 will be described hereafter on the basis of the flow chart in FIG. 3. In principle (302), ECU 201 is used as shown in FIG. 2 for detecting the direction toward an object in the surroundings of vehicle 100.

Figure 4:
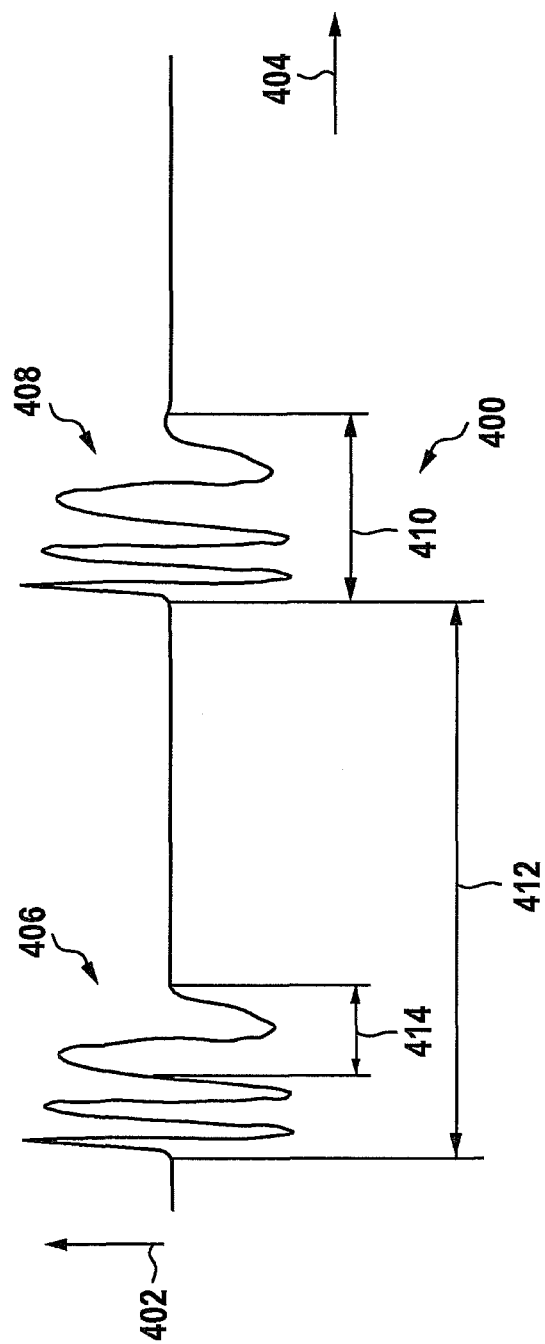
FIG. 4 shows a schematic view of an emitted measuring pulse sequence.

In step 304, a sequence of measuring pulses 400 is emitted by transmitter 202, as shown in FIG. 4. In the illustration of FIG. 4, a signal strength 402 is plotted against time 404. The sequence of measuring pulses 400 includes a sequence of one or more single pulses, of which two pulses 406, 408 are shown in FIG. 4. The pulses each have a pulse width 410 and follow one another at a time interval 412. The pulses are based on a pulse-modulated signal carrier, whose carrier frequency 414 is not constant in the case shown. Pulse sequence 400 outlined in FIG. 4 is emitted by transmitter 202 into space, as is shown by directional characteristic 118 shown in FIG. 1.

The emission of pulse sequence 400 by transmitter 202 is controlled by central control unit 206. "Central" means here that transmitter 202, optionally also receiver 116 and further sensors 204, does not have to have its own local time references, but rather the emission of the pulses and optionally also the detection of the echoes are carried out based on central time reference 210 of ECU 201. This simplifies the determination of a Doppler shift in the echoes. However, such a determination may also be performed in the case of systems in which the sensors transmit or receive pulses based on their own time references. Time reference 210 is a clock, such as a crystal oscillator or a comparable resonant system.

In step 306, a reflection of measuring pulse sequence 400 is received by receiver 116. Further receivers connected to ECU 201, such as the one in sensor 204, may also detect an echo of pulse sequence 400. The processing of this further echo is accordingly performed in the same way, therefore only the processing of the echo detected by receiver 116 is described hereafter. The echo signal is converted in receiver 116 into an electrical signal and relayed to central control unit 206. The signal is digitized (A/D conversion) here, for example, and buffered for later analysis by analysis unit 208. Control unit 206 also provides specifications with respect to measuring pulse 400 emitted by transmitter 202 to analysis unit 208 by buffering or in another way.

The specifications provided by control unit 206 to analysis unit 208 also contain the time stamps assigned to each of the transmitted/received pulses, which are based on time reference 210, whereby a correspondence in the event of offset and quantification may be achieved easily. A drift will typically be negligible, at least during the signal propagation times.

Figure 5:
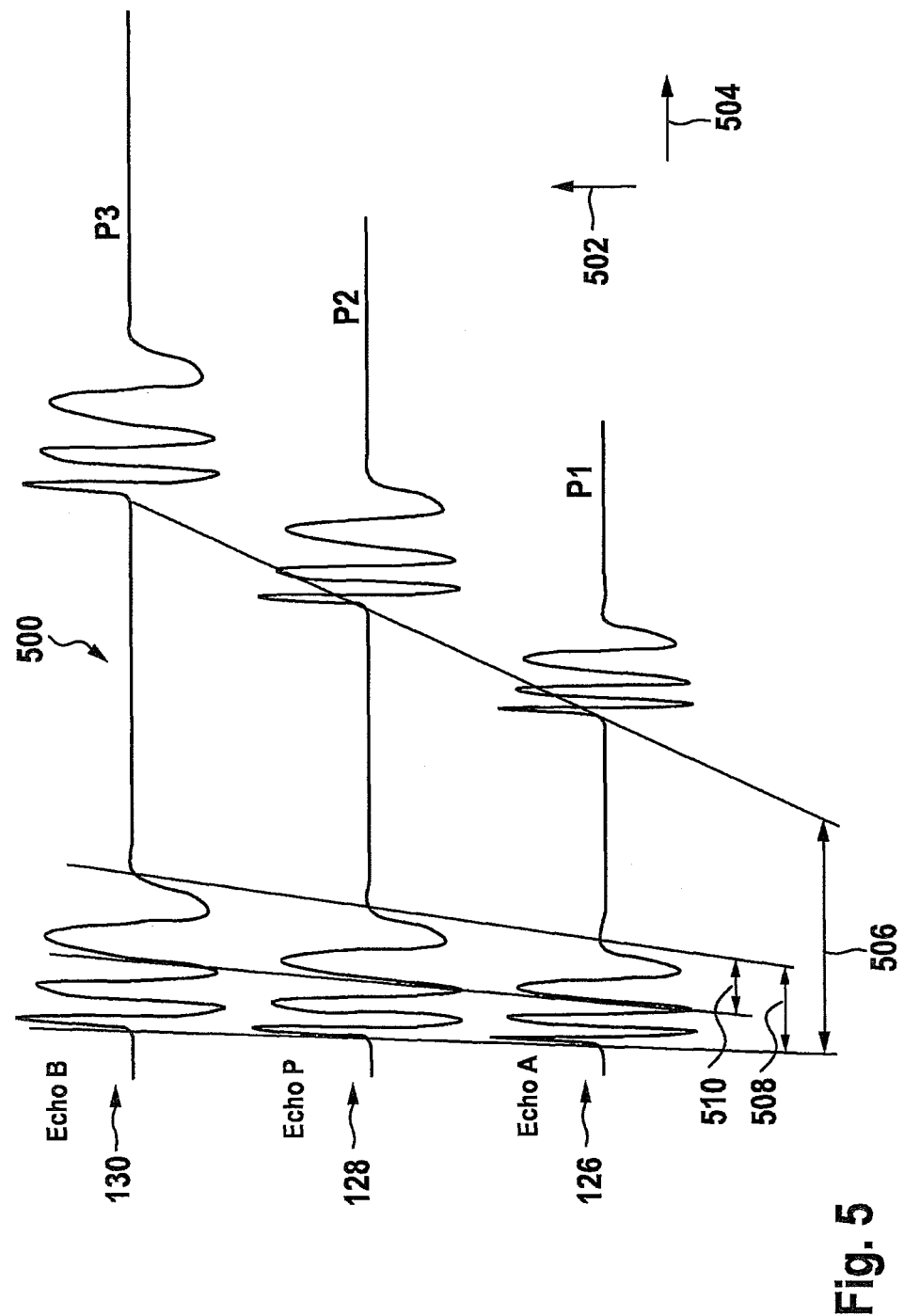
FIG. 5 shows a schematic view of multiple echoes of the measuring pulse sequence from FIG. 4.

In step 308, analysis unit 208 determines a Doppler shift between emitted measuring pulse sequence 400 from FIG. 4 and a received reflection 500, of which examples are shown in FIG. 5. In FIG. 5, in the same way as in FIG. 4, a signal strength 502 is shown against a time sequence 504, specifically for echoes 130, 128, and 126, as are reflected according to the exemplary scenario in FIG. 1 from objects 108, 106, and 104 in the direction toward receiver 116 in passing vehicle 100. As is apparent from FIG. 5, different Doppler shifts result because of the different relative speeds between each of the objects and the vehicle. For the illustration, these Doppler shifts are not outlined in relation to the emitted measuring pulse, but rather relative to one another in FIG. 5.

Thus, in the example shown in FIG. 1, the echo frequencies shift toward higher values because of the comparatively high relative speed between vehicle 100 and object 104 (echo 126) located in the travel direction. The frequencies of echo 128 remain essentially constant in relation to the emitted pulse, because object 106 is located laterally to passing vehicle 100; the relative speed is therefore close to zero. The frequencies in echo 130 shift toward lower values (or the period durations shift toward higher values), because object 108 remains behind vehicle 100, i.e., vehicle 100 moves away from object 108. As is apparent from FIG. 5, a corresponding shift (compression, stretching) of time interval 506 results in comparison to time pulse interval 412, likewise a shift (compression, stretching) 508 of the signal or pulse form in comparison to pulse width 410, and a shift (toward higher or lower frequencies) 510 of the frequency of the echo in comparison to signal frequency 414 of the emitted signals from FIG. 4.

Analysis component 208 provides specifications for the determined Doppler shift of representation unit 214. In step 310, representation unit 214 determines, from the Doppler shift or the Doppler shifts determined by analysis unit 208, a direction toward the detected object(s). A direction toward a reflecting object may be concluded from a measured Doppler shift, if the speed of vehicle 100 is known in relation to a roadway and under the assumption that the detected object is at rest in relation to the roadway. A vehicle speed may be measured via wheel sensors, for example.

Figure 6:
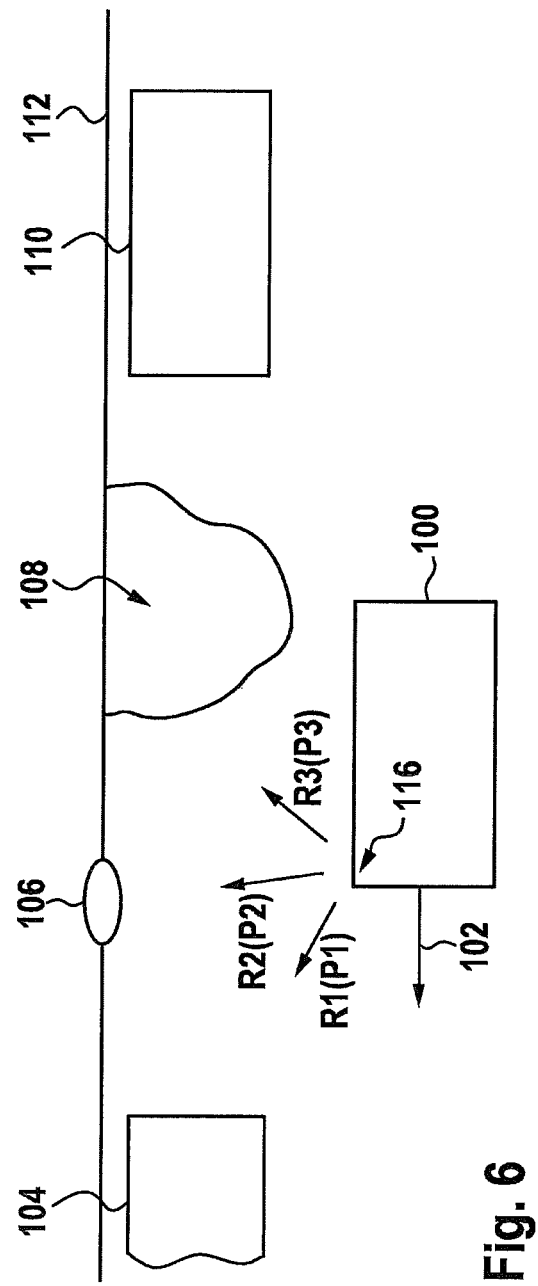
FIG. 6 shows an illustration of directional reconstructions performed by the driver assistance system based on ascertained Doppler shifts.

Analysis component 208 has (from the superposition of the three curves shown in FIG. 5, which is received by receiver 116) concluded the presence of three Doppler shifts. Accordingly, three objects must be present, whose echoes are each measurably compressed in a certain way (object 104), are hardly influenced (object 106), or are measurably stretched in a certain way (object 108). The spatial reconstruction accordingly carried out by representation unit 214 is shown in FIG. 6, the situation from FIG. 1 being used as a basis here for the illustration.

From a first determined Doppler shift p1 (toward higher frequencies or shorter periods; echo 126), a direction R1 toward the receiver is determined; object 104 lies in this direction R1. A lateral direction R2 is determined from the presence of an echo without Doppler shift p2≈0 (echo 128); object 106 is located in this direction. A direction R3 is determined from a third determined Doppler shift p3 (toward lower frequencies or longer periods; echo 130); object 108 lies in this direction. In this way, the system establishes that multiple objects are present in different directions (independently of distance values). To increase the angle resolution, the representation unit may additionally use specifications of directional characteristic 118 (cf. FIG. 1).

In step 312, analysis unit 308 (or another unit of ECU 201) determines a distance to each of the reflecting objects based on the received reflections. This determination is based on the signal propagation time, which may be easily established, if shared time reference 210 is used for the transmission and the reception of the pulses.

Representation unit 214 then prepares in step 314, based on the direction and distance of the detected objects, a representation of the object detected in the surroundings of the vehicle in a form which is reasonable for further processing. For example, a map view or a view from a bird's eye perspective may be generated, which is intended for output on a display unit of information system 218. Representation unit 214 may also relay corresponding information on the surroundings of the vehicle to activation unit 216, which, based on this information, carries out an active lateral guidance (steering controller 220) and/or active longitudinal control (brake controller 222 or engine controller 224).

The method ends in step 316. However, in a continuously operating system, the sequence branches back to step 304 after step 314 until, for example, a parking space is found. In sequence 300 shown in FIG. 3, a sequential determination of direction and distance is carried out. In another exemplary embodiment, a plurality of steps may be carried out in parallel. In particular, a determination of direction and distance may be performed independently of one another, i.e., steps 308 and 310 may be processed in parallel to step 312.

The determination of the Doppler shift in analysis unit 208 may be based in the simplest case on only one of shifts 506, 508, and 510 (cf. FIG. 5). Thus, for example, only a shift of pulse intervals 506 in relation to those 412 of emitted measuring signal sequence 400 may be measured. For permanent or occasional increase of the precision, for example, at low vehicle speeds and/or relative speeds, two of three shifts 506, 508, and 510 may be used. Thus, for example, in one exemplary embodiment, both pulse interval 506 and the shift of the signal frequency of echo pulse 510 may be measured. Other pairs are also possible. In yet another exemplary embodiment, all three shifts 506, 508, and 510 are measured and the actually existing Doppler shift is concluded via them.

To determine the Doppler shift, a frequency analysis may be carried out, for example, based on a fast Fourier transformation (FFT). Alternatively or additionally to time reference 210 and/or time measuring device 212, a frequency transducer, for example, a voltage-frequency transducer, may be operated in ECU 201 (cf. FIG. 2). However, with reference to Doppler shift 510 of the signal frequency of the measuring pulses, it is true that in the case of typical electroacoustic transducers, comparatively strong variations of the signal frequency occur within pulse width 410 (this is indicated in FIG. 4 in the case of pulses 406 and 408). These variations are greater than the typically occurring Doppler shifts, so that a determination of the Doppler shift based on a frequency analysis is complex.

In the exemplary embodiment described here, an analysis based on correlative time measurements is therefore proposed. In this case, for example, a period duration of carrier frequency 414 and 510 or a period duration of pulse interval 412 and 506 is measured. Such time measurements may be carried out with greater precision and may be processed easily in sequential architectures in the case of the currently routine high-clock-rate systems. For this purpose, in the exemplary embodiment of FIG. 2, time measuring device 212 is provided. With the aid of time measuring device 212 set to high-clock-rate time reference 210, analysis unit 208 may therefore quantify or measure the signal curves of echoes 130, 128, or 126 (FIG. 5) with high precision, and determine the corresponding Doppler shifts in relation to measuring pulse sequence 400 (FIG. 4).

Figure 7:
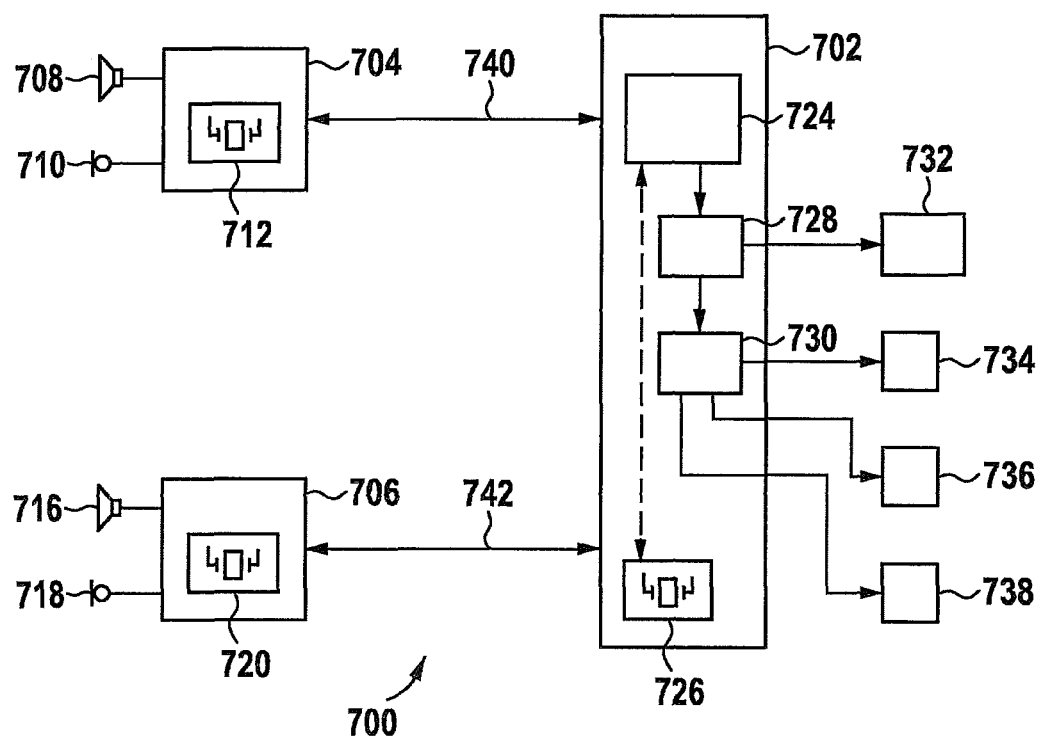
FIG. 7 shows functional components of a second exemplary embodiment of a driver assistance system according to the invention.

FIG. 7 schematically shows a second exemplary embodiment of a driver assistance system 700 implemented according to the present invention. A processing component 702 (hereafter "ECU 702") is also provided here detached from a plurality of sensors, of which sensors 704 and 706 are indicated as examples. Sensor 704 has a transmitter 708 and a receiver 710 and also its own local time reference ("clock") 712 and a time measuring device (not shown) set thereto. In a similar way, sensor 706 has a transmitter 716, a receiver 718, a time reference 720, and a time measuring device (not shown).

ECU 702 includes an analysis unit 724, optionally a time reference 726, a representation unit 728, and an activation unit 730. A driver information system 732 and a steering controller 734, a brake controller 736, and an engine controller 738 are connected to ECU 702. Sensors 704, 706 communicate with ECU 702 via connections 740 or 742, which may run, for example, via a bus system such as CAN, FlexRay, or other cable-supported systems, or which may be wireless connections, which are placed, for example, on systems such as WLAN, DECT, HiperLAN, Bluetooth, or ZigBee.

Figure 3:
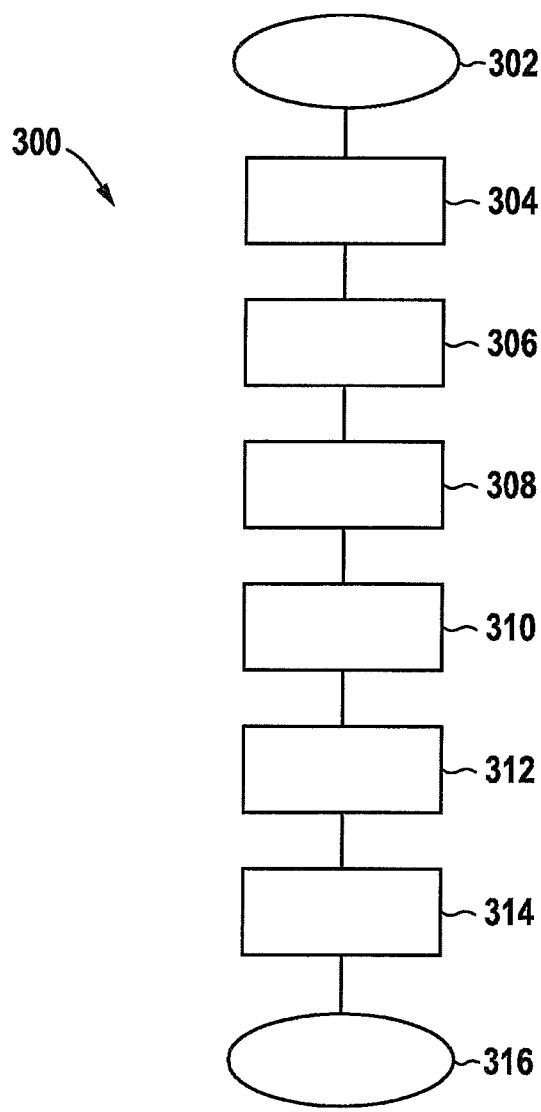
FIG. 3 shows a flow chart to illustrate a mode of operation of the driver assistance system from FIG. 2.

A method for the direction determination and optionally distance determination of objects in the surroundings of a vehicle runs similarly as described in flow chart 300 of FIG. 3 for the exemplary embodiment of FIG. 2. However, sensors 704 and 706 transmit and receive measuring pulses in each case based on their own time reference 712 and 720, respectively. In general, time reference 712 of sensor 704 will differ from time reference 720 of sensor 706 according to offset and drift, i.e., there are sometimes non-negligible deviations. This is to be taken into consideration in the Doppler shift determination.

Initially, however, the simple case is considered that, for example, sensor 704 only analyzes reflections of its own measuring pulse sequences. In this case, the emission of a measuring pulse sequence from transmitter 708 and the reception of the echo by receiver 710 are based on shared time base 712. In this case (if the drift of time reference 712 during the echo travel times is negligible), a Doppler shift in the echo may be determined locally by an analysis unit (not shown in FIG. 7) in sensor 704. The result is then transmitted via connection 740 to ECU 702 and is used therein in the above-described way to prepare a representation of the surroundings of the vehicle for display and optionally for active longitudinal and/or lateral guidance.

However, if the drift of time reference 712 is already non-negligible during the signal propagation time, only a preliminary Doppler shift may be determined by sensor 704, which must be corrected in analysis unit 724 of ECU 702. This will also normally be true for the case in which multiple sensors are used for receiving the echoes. For example, if a measuring pulse signal emitted by transmitter 708 is detected both by receiver 710 and by receiver 718, a Doppler shift determination in sensor 706 based on local time reference 720 will generally be imprecise, because time references 712 and 720, even in the event of an identical offset at a specific point in time, will drift toward one another, for example, for cost reasons. Therefore, in the case of measurements by multiple sensors, it is necessary to exchange synchronization information with the ECU.

If the drift of the local time references in the sensors during the echo travel times is negligible, it is thus conceivable with respect to the example in FIG. 7 that time references 712 and 720 in sensors 704 and 706 are synchronized to an identical offset by synchronization information transmitted from ECU 702 via connections 740 and 742. Alternatively, a specification with respect to the state of time reference 712 at the point in time of the emission of a measuring pulse may be transmitted to ECU 702 by the transmitting unit, for example, sensor 704. The receiving unit, for example, sensor 706, transmits a specification with respect to the state of time reference 720 at the point in time of the reception of the echo. ECU 702 may ascertain the Doppler shift therefrom.

As yet another alternative, it is conceivable that one of the local time references is used as the base. Thus, for example, sensor unit 704 may transmit synchronization information to the further sensors participating in the measurement via a shared bus system. The detached sensors may then synchronize themselves to time reference 712, for example, using a PLL ("phase-locked loop") algorithm, which is known to those skilled in the art. Time reference 726 of ECU 702 may also be used as the base.

In the case in which a receiving sensor unit may directly measure the crosstalk of an emitted signal after the corresponding propagation time, the receiving sensor unit may determine the offset of the time references of the transmitting unit and the receiving unit directly from the transmitted crosstalk signal. Thus, for example, if the time reference of the transmitting sensor is used as the base for a measurement, a further time reference in the processing device may be omitted. However, if an ECU is used as the processing device, the precise time reference may be used which is normally provided therein in any case.

If the drift between the time references of a transmitting sensor unit (for example, sensor 704) and a receiving unit (for example, sensor 706), or the drift of the time reference of the transmitting sensor is large enough to be already not negligible during the echo travel times, a specification for the state of the time reference during the emission and a specification for the state of the time reference during the point in time of the echo reception, optionally in addition to the preliminary Doppler shift locally determined by the receiving sensor, may be transmitted as synchronization information to the higher-order processing device (ECU 702). This ECU may then ascertain a final value for the Doppler shift of the echo from the preliminary Doppler shift and the received synchronization information.

The above-described specific embodiments therefore allow the cost-effective use of time or frequency references of lower long-term stability, the precision required for the determination of Doppler shifts being achieved by corresponding frequently repeated transmission of synchronization information to the sensors, and/or by the transmission of the particular instantaneous status of the time or frequency reference in addition to the specifications relating to the Doppler shift to the central processing unit.

Figure 8:
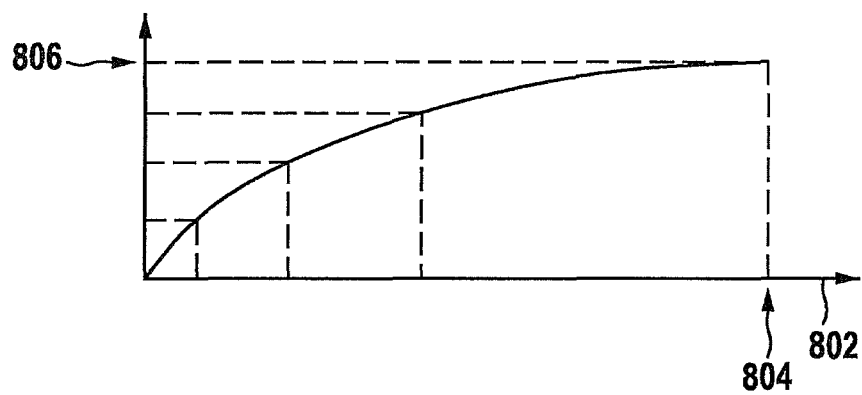
FIG. 8 shows a schematic view of nonlinear data coding.

FIG. 8 shows a coding characteristic curve of a variable 802, for example, an echo travel time measured in a sensor or a preliminary Doppler shift locally ascertained in a sensor. Axis 804 designates measured or ascertained values, and axis 806 designates a specification representing the measured or ascertained values, which are then transmitted to ECU 702, for example, via a communication connection 740, 742. The graph in FIG. 8 illustrates that, for example, for greater measured values 804, a coarser quantification is used than for smaller values. The digital transmission of the data is therefore performed in such a way that smaller measured or ascertained values are quantified and transmitted with better resolution and higher measured or ascertained values are quantified and transmitted with lower resolution. In this way, the scope of the data to be communicated may be reduced. Nonlinear coding as shown in FIG. 8 may also relate to negative measured or ascertained values, for example, a Doppler shift. For this purpose, the graph of FIG. 8 could be reflected at the zero point.

The exemplary embodiments and/or exemplary methods of the present invention are not restricted to the exemplary embodiments described here and the aspects emphasized therein; rather, a plurality of alterations is possible within the range specified by the dependent claims in the scope of measures routine to those skilled in the art.

What is claimed is:

1. A method for a driver assistance system of a vehicle for detecting a plurality of objects in surroundings of the vehicle about a parking space, the method comprising:
   emitting a sequence of measuring pulses toward the parking space by a transmitter;
   receiving reflections of the measuring pulses off the plurality of objects about the parking space by at least one receiver, the reflections including a reflection carrier modulated by reflection pulses;
   determining a speed of the vehicle;
   determining Doppler shifts between the emitted measuring pulses and the received reflections in an analysis unit, wherein determining the Doppler shifts includes at least one of:
   determining a time difference between a pulse width of the reflection pulses and a pulse width of the measuring pulses, or determining a time difference between pulse intervals of the reflection pulses and pulse intervals of the measuring pulses; and
   determining directions toward the objects based on the determined Doppler shift, the determined speed of the vehicle, and an assigned speed of zero for the plurality of objects, wherein determining the directions is independent of determining distances toward the objects, and wherein for values of the determined Doppler shifts indicating frequencies of the reflections higher than corresponding frequencies of the measuring pulses, the determined direction is toward ahead of the vehicle, and for values of the determined Doppler shifts indicating frequencies of the reflections lower than corresponding frequencies of the measuring pulses, the determined direction is toward behind the vehicle.

2. The method of claim 1, wherein at least one of a shift of a pulse signal frequency, a shift of a pulse shape, and a shift of a time interval between two measuring pulses are ascertained to determine the Doppler shift.

3. The method of claim 2, wherein at least two of the mentioned shifts are ascertained to determine the Doppler shift.

4. The method of claim 2, wherein a time difference in a period duration within the signal frequency of a measuring pulse is detected to determine the Doppler shift.

5. The method of claim 1, further comprising:
determining a distance to the object based on the received reflection in the analysis unit; and
determining a spatial position of the object in the surroundings of the vehicle based on distance and direction.

6. The method of claim 1, wherein the analysis unit is detached from the transmitter and the one receiver or the multiple receivers.

7. The method of claim 6, wherein time reference information is exchanged between a central processing component and the transmitter or the receiver(s).

8. The method of claim 6, wherein nonlinear coding is used to at least one of transmit transmitted information from the transmitter to the analysis unit and transmit received information from the receiver to the analysis unit.

9. The method of claim1, wherein for values of the determined Doppler shift indicating frequencies of the reflection being substantially the same as frequencies of the measuring pulse, the determined direction is toward a side of the vehicle.

10. A non-transitory computer readable medium having a computer program, which is executable by a processor to perform a method for a driver assistance system of a vehicle for detecting a plurality of objects in surroundings of the vehicle about a parking space, the method comprising:
emitting a sequence of measuring pulses toward the parking space by a transmitter;
receiving reflections of the measuring pulses off the plurality of objects about the parking space by at least one receiver, the reflections including a reflection carrier modulated by reflection pulses;
determining a speed of the vehicle;
determining Doppler shifts between the emitted measuring pulses and the received reflections in an analysis unit, wherein determining the Doppler shifts includes at least one of: determining a time difference between a pulse width of the reflection pulses and a pulse width of the measuring pulses, or determining a time difference between pulse intervals of the reflection pulses and pulse intervals of the measuring pulses; and
determining directions toward the objects based on the determined Doppler shift, the determined speed of the vehicle, and an assigned speed of zero for the plurality of objects, wherein determining the directions is independent of determining distances toward the objects, and wherein for values of the determined Doppler shifts indicating frequencies of the reflections higher than corresponding frequencies of the measuring pulses, the determined direction is toward ahead of the vehicle, and for values of the determined Doppler shifts indicating frequencies of the reflections lower than corresponding frequencies of the measuring pulses, the determined direction is toward behind the vehicle.

11. The non-transitory computer readable medium of claim 10, wherein for values of the determined Doppler shift indicating frequencies of the reflection being substantially the same as frequencies of the measuring pulse, the determined direction is toward a side of the vehicle.

12. A driver assistance system for a vehicle for detecting a plurality of objects in surroundings of the vehicle about a parking space, comprising:
a transmitter for emitting a sequence of measuring pulses toward the parking space;
at least one receiver for receiving reflections of the measuring pulses off the plurality of objects about the parking space, the reflections including a reflection carrier modulated by reflection pulses;
a sensor for determining a speed of the vehicle;
an analysis unit for determining Doppler shifts between the emitted measuring pulses and the received reflections, wherein determining the Doppler shifts includes at least one of: determining a time difference between a pulse width of the reflection pulses and a pulse width of the measuring pulses, or determining a time difference between pulse intervals of the reflection pulses and pulse intervals of the measuring pulses; and
a component for determining directions toward the objects based on the determined Doppler shift, the determined speed of the vehicle, and an assigned speed of zero for the plurality of objects, wherein determining the directions is independent of determining distances toward the objects, and wherein for values of the determined Doppler shifts indicating frequencies of the reflections higher than corresponding frequencies of the measuring pulses, the determined direction is toward ahead of the vehicle, and for values of the determined Doppler shifts indicating frequencies of the reflections lower than corresponding frequencies of the measuring pulses, the determined direction is toward behind the vehicle.

13. The driver assistance system of claim 12, wherein for values of the determined Doppler shift indicating frequencies of the reflection being substantially the same as frequencies of the measuring pulse, the determined direction is toward a side of the vehicle.

* * * * *